July 4, 1967  L. PÉRAS  3,329,038
METHODS OF AND MEANS FOR RE-ACCELERATING THE DRIVE THROUGH AN
AUTOMATIC TRANSMISSION MECHANISM WITH TORQUE
NEUTRALIZING MEANS FOR AUTOMOTIVE VEHICLES
Filed Jan. 27, 1964  2 Sheets-Sheet 1

Inventor
Lucien Péras
By Stevens, Davis, Miller + Mosher
Attorneys

United States Patent Office 3,329,038
Patented July 4, 1967

3,329,038
METHODS OF AND MEANS FOR RE-ACCELERATING THE DRIVE THROUGH AN AUTOMATIC TRANSMISSION MECHANISM WITH TORQUE NEUTRALIZING MEANS FOR AUTOMOTIVE VEHICLES
Lucien Péras, Billancourt, France, assignor to Regie Nationale des Usines Renault, Billancourt, France
Filed Jan. 27, 1964, Ser. No. 340,393
Claims priority, application France, Jan. 30, 1963, 923,193, Patent 1,354,984
4 Claims. (Cl. 74—472)

ABSTRACT OF THE DISCLOSURE

Device for controlling the change of speed of a transmission the servo-mechanism of which, by means of a lost motion device and when the accelerator pedal is despressed, displaces the transmission fork and actuates contacts of an electric circuit to control a relay acting on an auxiliary gas inlet valve to open the latter and reaccelerate the engine when a sufficient force acts on the sychonizer ring of the transmission.

---

Figure 1:
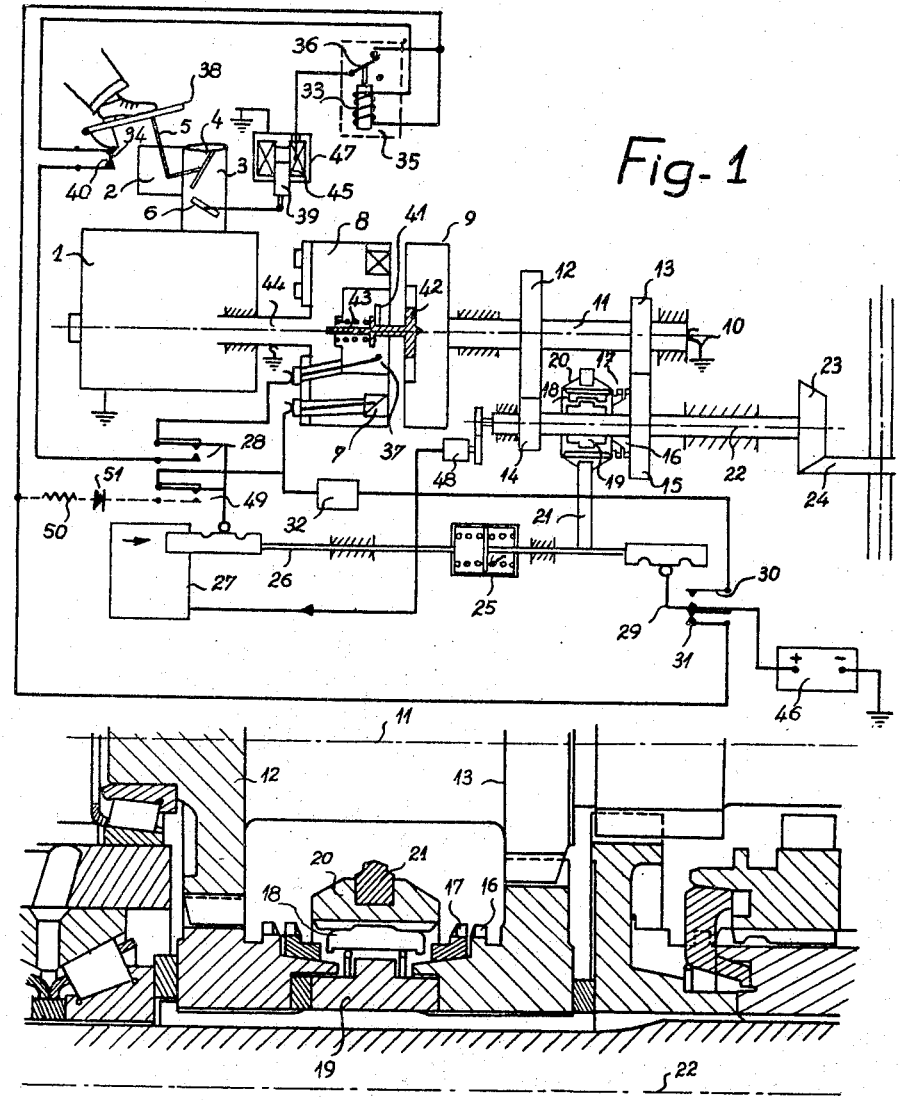

With automatic transmission mechanisms or gearboxes incorporating means for neutralizing the torque and wherein a servo action is substituted for the driver's action on the transmission mechanism, clutch and throttle control, it is advantageous to re-accelerate the engine when changing to a lower gear in order to facilitate the synchronization and make the torque resumption smoother.

With this object in view it has already been proposed to control the re-opening of the throttle valve by means of a synchronism detector mounted in the clutch and responsive to the direction of relative rotation of the driving member and driven member of the clutch. However, if this arrangement is operated without any corrective action it becomes a source of faulty operation notably when changing to a higher gear. Untimely beats are produced even when changing to a lower gear when the speed change control member is close to the neutral position. During the time when neither the dog clutch nor the mechanical synchromesh device concerned are engaged, the synchronism detector is obviously unable to operate effectively since the clutch output shaft is free.

It is the object of this invention to provide a method of re-accelerating when changing to a lower speed (or a higher ratio), whereby the above-mentioned drawbacks are avoided. This method is characterized in any re-acceleration is positively prevented until the servo action controlling the gear shift forks has completed its movement, whereafter this servo action bears through an elastic member against the synchromesh striking rings, thus causing these rings to transmit with some slippage a certain amount of torque from the vehicle wheels to the clutch output shaft.

Under these conditions the synchronism detector mounted in the clutch can operate satisfactorily by allowing the engine re-acceleration to take place when changing to a lower gear immediately when the gearbox fork servo action has completed its stroke. The throttle is closed again when the synchronism between the engine shaft and the clutch output shaft is restored, mostly before the dogs disposed between the clutch output shaft and the other elements of the transmission mechanism or gearbox are actually engaged.

Thus, any detrimental beats when changing to a higher gear are eliminated, if the reduction in engine speed is not too considerable during the gear change and if a sufficient torque is transmitted through the synchromesh.

Although this arrangement is apparently not so satisfactory as the comparison of the input and output speeds of the gearbox by means of external devices, it nevertheless affords considerably simpler and therefore economical constructions providing a highly satisfactory and reliable operation. Thus, notably, it eliminates the detrimental clutch drag which is henceforth used for synchronizing purposes. If required, this drag may be increased by resorting to electric means.

Figure 2:
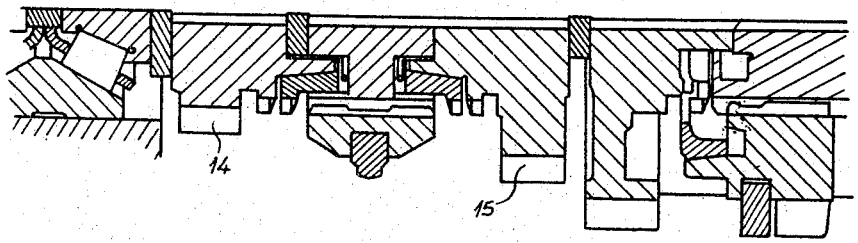
Figure 3:
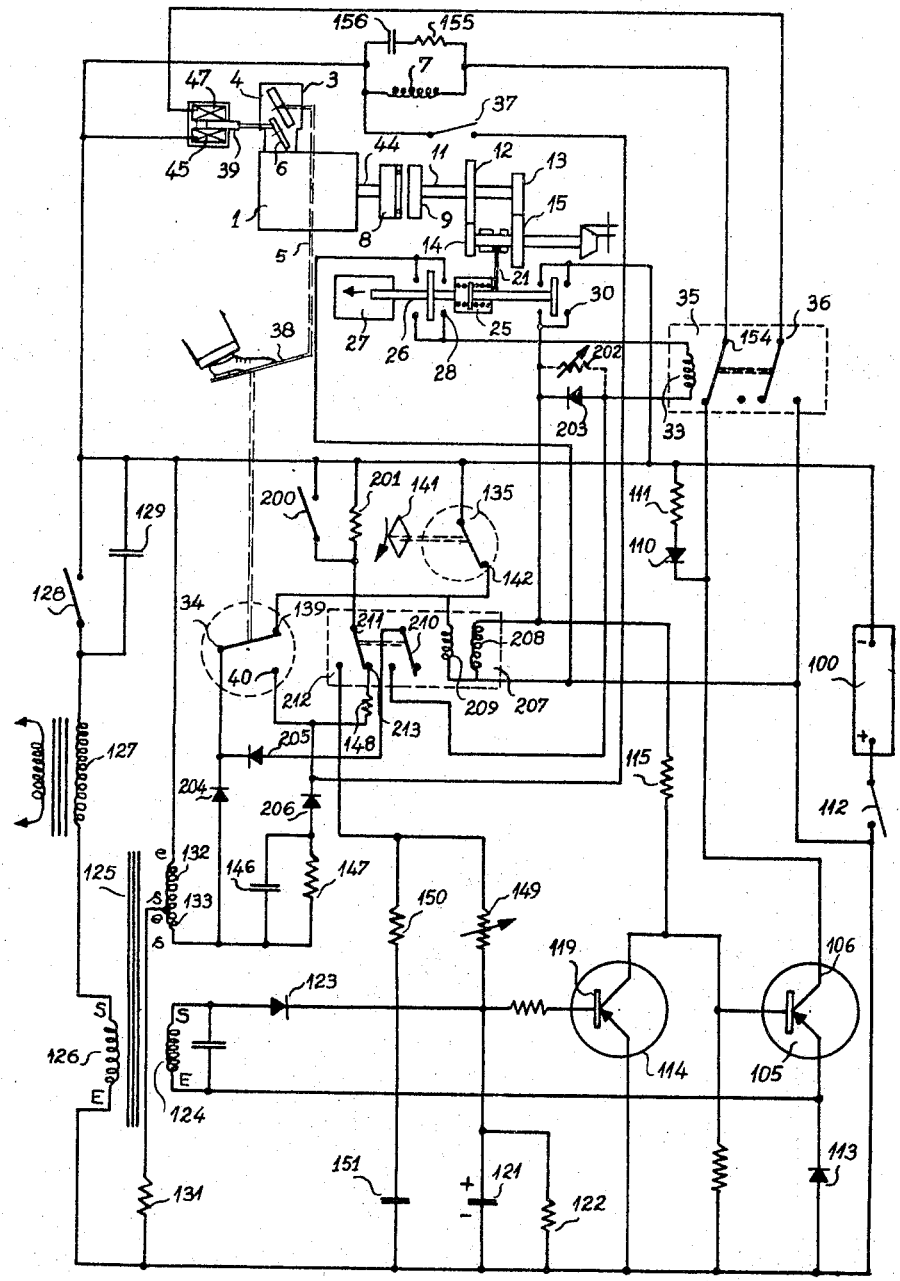

In order to afford a clearer understanding of this invention and of the manner in which the same may be carried out in practice, reference will now be made to the accompanying drawing illustrating diagrammatically by way of example a typical form of embodiment of this invention. In the drawing:

FIGURE 1 is a diagrammatic illustration of the basic arrangement of the mechanical and electrical component elements of a transmission unit comprising an electromagnetic clutch and parallel shafts, wherein the engine re-acceleration is obtained according to the method of this invention;

FIGURE 2 is a longitudinal cross section showing a synchromesh device of known construction incorporating details of the corresponding portion of FIGURE 1, and FIGURE 3 is a wiring diagram concerning a device constructed according to the teachings of this invention and applied to a transmission mechanism of the type disclosed in a preceding patent application filed in U.S.A. on Jan. 25, 1963, under Ser. No. 253,900, now U.S. Patent No. 3,203,518 of which the principle of operation will be reminded as this description proceeds.

Referring first to FIGURE 1, the inventive arrangement is shown in an intermediate position between gear ratios. The engine of the vehicle to which this invention is applied is designated by the reference numeral 1. This engine comprises a carburetor 2, a choke tube 3 or an inlet pipe or manifold adapted to be closed by means of a first throttle 4 connected through a linkage 5 to the accelerator pedal 38, and by a second throttle 6 controlled by the plunger 39 of an electromagnet 47. This second throttle 6 is so adjusted that in the closed position, with the plunger attracted by the energized electromagnet coil, the gas passage is closed only partially. Secured on the output shaft 44 of the engine is the driving member 8 of an electromagnetic clutch of any known and suitable type, the winding of which is shown at 7. The driven member 9 is secured on a shaft 11 carrying various pinions 12, 13 meshing with other pinions 14, 15 adapted to revolve freely on shaft 22 except when the dogs carried by these pinions 14, 15 are in relative engagement. Only the intermediate component elements concerning the drive through the reduction gears 13–15 are illustrated in FIGURE 1, whereas all the component elements relating to the ratio given by gears 13–15 and 12–14 are illustrated in FIGURE 2 with more details but the intermediate members for producing the engagement of gear ratio 13–15 being the only numbered ones.

In the direction of engagement of the ratio gears 13–15, the selector ring 20, solid with selector fork 21, acts through the medium of a key 18 upon the synchromesh striking ring 17 and the dog 16 of pinion 15, the drive with shaft 22 occuring through the hub 19.

Reverting now to FIGURE 1, the motion is transmitted from the output shaft 22 through a bevel gearing 23, 24 to the road or like wheels of the vehicle. The shaft 11 is grounded, i.e. electrically connected to the chassis frame of the vehicle, by means of a spring 10. Between the driving and driven members of the clutch a synchronism detector of any known type is disposed, for example a limited-beat, friction-type detector comprising a member 42 urged by a spring 43 for constant frictional contact with the plate 9, a movable contact 41 electrically connected to the chassis frame of the vehicle, an insulated contact 37 fixed in relation to plate 8 and electrically connected through said movable contact 41 to the chassis frame of the vehicle by means of said shaft 11 when the engine 1 revolves at a speed inferior to that of shaft 11. When engaging the reducing ratio given by the gears 13 and 15, the servo mechanism 27 moves the rod 26 in the direction of the arrow, this rod 26 being connected through the lost-motion device 25 to the fork 21. At the end of the stroke provided by the servo mechanism this rod 26 closes contacts 28 and 49 while the fork 21, at the end of the movement of engagement of the dogs, actuates a reversing contact blade 29 whereby the storage batttery 46 of the vehicle is electrically connected to the modulator 32 through the fixed contact 30 to energize the clutch winding 7; in the middle position of fork 21 it is the fixed contact 31 that is connected to the battery 46, thus applying energizing voltage to one end of the winding 33 of relay 35, the other end of said winding 33 being grounded through contacts 34 and 40 (which close only when the accelerator pedal 38 is depressed), contact 28 and contacts 37, 41 and 10 already cited hereinabove. Relay 35 is provided with a contact 36 for connecting the battery 46 through contact 31 to the winding 45 of electromagnet 47, which, when the latter is energized, will partially close the choke throttle 6. The modulator 32, acting upon the clutch energizing current, may be of any known type and notably be adapted to cause this current to be responsive to the engine speed, to adequate time factors, to the engaged gear ratio, to the position of the accelerator pedal, etc.

The gearbox servo-mechanism 27 may be operated by a tachometric device 48 connected to the output shaft 22 of the gearbox or by any other known and suitable device performing a similar function. An auxiliary contact 49, closed in the end position of the servo mechanism 27, is adapted (as shown in broken lines as an alternative in the figure) to connect the winding 7 to contact 31 through a high-value resistance 50 and a diode 51.

This device operates as follows: the change from the 12–14 gear ratio to the more reduced gear ratio 13–15 under the control of tachometric device 48 will firstly displace the rod 26 to the right, under the control of the servo mechanism 27, with the rod compressing the lost motion device 25 and accessorily opening contacts 28 and 49.

When a sufficient degree of compression has been attained, the fork 21 is moved to the right, thus discontinuing the delivery of energizing current to the clutch winding 7 through contact 30 and disengaging the clutch. The winding 45 of electromagnet 47 is energized through contact 31, thus causing the partial closing of the choke by means of the auxiliary throttle valve 6. Relay 35 cannot become operative since contact 28 is open as a consequence of the movement of rod 26.

As the fork movement is continued, the selector ring 20 is released from the dogs of pinion 14 (shown only in FIGURE 2) and presses the synchronizer striking ring 17 against the cone portion of dog 16. If the dogs are not brought immediately into meshing engagement the servo mechanism 27 further compresses the lost motion device 25 and closes the contacts 28 and 49 at the end of its permissible movement. The blade 29 is actuated at the end of the gear change movement, previously remaining in the position shown in FIG. 1, corresponding to the energization of electromagnet 47 through contact 31. It appears that under normal conditions it would be necessary to wait until the dogs are synchronized and actually engaged before re-opening the accelerator throttle and re-energizing the clutch winding, but this process may be accelerated by virtue of the device of this invention. In fact, the closing of contact 28 permits energizing the coil 33 by establishing a ground path provided that the accelerator pedal is depressed (thus closing contacts 34–40) and that the engine speed is lower than that of shaft 11 (thus closing the synchronism detector of which contact 37 is grounded). This is actually the condition obtained when changing to a lower gear, that is, a gear providing a higher transmission ratio, provided that the gearbox synchronizer is firmly urged against the springs of the lost motion device 25 and that under these conditions a torque is transmitted from the wheels of the vehicle to the shaft 11 (as when coasting).

The electromagnet 47 is de-energized when relay 35 becomes operative; thus the throttle valve is re-opened and the engine re-accelerated until the synchronism detector 37 is open. Then the throttle is re-closed and the dogs are rapidly re-engaged. The gear-box synchronization is facilitated by the drag of clutch 8, 9 in the released position and also by the specific position of the synchronism detector.

According to a modified form of embodiment of this invention, the clutch drag may be increased to accelerate the synchronization process by energizing the winding 7 through resistance 50, the non-return diode 51 and the contact 49, mechanically coupled with contact 28, these two contacts being closed at the end of the movement produced by the servo mechanism. This modified construction necessitates the use of a really positively-operating gearbox synchronizer.

Whether the dog re-engagement was immediate or a re-acceleration took place according to the above described process, the dog re-engagement (corresponding to the end portion of the movement accomplished by fork 21) opens contacts 29, 31 and closes contacts 29, 30, thus re-energizing the clutch and re-opening the choke throttle valve.

In addition to the reduction in synchronizing time, the engine pick-up is also improved considerably or, in other words, the engine revolutions per minute are increased within a shorter time period which commences immediately as soon as the servo mechanism has completed its movement, instead of at the end of the gearbox stroke or gear-change movement.

FIGURE 3 illustrates the wiring diagram of a typical form of embodiment of this invention, wherein the modulator 32 controlling the energization of the electromagnetic clutch shown in FIGURE 1 consists of the feed device constituting the subject-matter of the aforesaid Patent 3,203,518 of same applicant, and in this example various elements are combined with a view to simplify the construction as much as possible.

Most of the reference numerals designating component elements common to the above-mentioned patent and the present device have been maintained but increased by 100. The component elements already shown in FIGURE 1 of the attached drawing are designated mainly with the same reference numerals.

The operation of this modulator is explained hereinafter:

The winding 7 of the clutch is energized from the storage battery 100 of the vehicle as a function of the engine speed through the power transistor 105 and diode 113, provided that contact 154 is established and that key switch 112 is closed; under these conditions a feedback energy recovery circuit consisting of the diode 110 and resistance 111 is connected in parallel with coil 7. This PNP-type transistor 105 receives orders from a PNP-type transistor 114, provided that one of contacts 30 is closed. Said transistor 105 is conductive only if transistor 114 is not conductive. The base electrode 119 of transistor 114 is blocked during a substantially constant time period each time the contact breaker 128, revolving in synchronism with the engine 1, is opened. To this end, the primary 126 of a multiple-winding transformer 125 is connected in series with the primary of the ignition coil 127. Thus, the winding 124 will charge positively through the diodes 123 and 113 and the capacitor 121, which is discharged mainly into resistance 149, provided that contact 211–212 is closed, the current returning to the negative terminal of the storage battery through resistance 201 or switch 200. When contact 211–212 is open, capacitor 121 is discharged only through the relatively high resistance 122, the contact opening movements taking place gradually due to the presence of the high-value tank capacitor 151 associated with a protection resistance 150.

Each charging wave of capacitor 121 will block transistor 114 and cause transistor 105 to be conductive and a current to flow through the coil 7, transistor 105 being protected by the recovery circuit against contact breaking effects. As the engine speed increases, the charging waves become gradually closer and closer to each other until they are joined together, the ratio of the conductive time to the non-conductive time of transistor 105 increasing up to the 1:1 value.

Transformer 125 is provided with an auxiliary winding 132, 133 through which flow alternating current and direct current fed through resistance 131 for the purpose of taking one fraction of the energy normally intended for charging capacitor 121 and thus modifying under the influence or control of auxiliary parameters, the current flow through coil 7 as a function of engine speed.

The closing of the circuit comprising windings 132 and 133, resistances 148, 201, 147 with capacitor 146 and diodes 204 and 206 in parallel, as a consequence of the contact disposal 34–139–40, 200, 211, 212, 213, 37, permits obtaining a current-intensity in coil 7 which is a function of engine speed, which differs and as a rule is weaker than that obtained when the end of winding 133 is left free by the above-mentioned set of contacts. Thus, more particularly, the closing of contacts 34–139 and 135–142 will short circuit windings 132, 133 through the diode 204 and produce a very weak current through the clutch winding irrespective of the engine speed. The reference numeral 200 designates a contact closed only when the lowest gear is engaged, in order to reduce the closing impedance of windings 132 and 133 to resistance 148 and diode 206 only, thus providing a very smooth current law when changing to first gear.

When contacts 211 and 212 is closed, capacitor 121 is discharged mainly through resistance 149 and the current flow through coil 7 is only subordinate to the engine speed and, if need be, to the impedances connected to the winding 133 modifying said current flow.

On the other hand, when contacts 211, 212 is open, the extension effect caused by the presence of tank capacitor 151 provides a flow depending only on the time elapsed since contact opening and leads to the development of a maximum current in coil 7, the capacitor 151 being discharged and finally charged in the reverse direction by the charging waves of capacitor 121.

This device will now be described with reference more particularly to the subject-matter of the present invention.

The accelerator pedal 38, in addition to the throttle valve 4, actuates the contact blade 34 to engage the fixed contact 40 immediately as the driver's foot has depressed the accelerator, and the other contact 139 in the "raised foot" position.

A device 141, responsive to the vehicle speed, opens contact 135–142 above a relatively low speed value inferior to that necessary for changing from the lowest gear to second gear. This contact 142 is connected to the coil 209 of a second relay 207 having another coil 208 of same value but mounted in opposition with respect to said first coil, their common ends being connected to the positive terminal of the storage battery 100 through the key switch 112. The other end of coil 208 leads back to the negative terminal of battery 100 through the gearbox limit switch contacts 30. Relay 207 incorporates a blade 211 adapted, in the de-energized condition, to engage contact 212 and in the energized condition to engage the opposite contact 213, and a front contact 210 insulated from the preceding ones.

The resistance 115 delivering, according to circumstances, the collector current to transistor 114 or base current to transistor 105 is connected back to the negative terminal of the battery through the same gearbox limit-switch contact 30 which acts also as a return contact through a diode 203 (and as an alternative also through a resistance 202) to the winding 33 of relay 35. The other end of winding 35 is connected to the positive terminal of the battery through the servo-motion limit switch contacts 28. If a resistance 202 is provided, it will have a relatively high value so that under no circumstance can it cause the operation of relay 35.

When contacts 30 are not closed, coil 33 may be connected back to the battery negative terminal through contacts 210, diode 205, contacts 34–40 and contact 37.

Relay 35 is provided with a front contact 154 for energizing the winding 7 and a back contact 36 for energizing the electromagnet 47 controlling the closing of the throttle value.

It may be noted that if the energization of relay 35 connects the clutch winding 7 to the collector 106 of transistor 105, no appreciable current will flow as long as the return circuit from the biasing resistance 115 is not provided through the gearbox limit switch contacts 30. As an alternative form of embodiment, the resistance 202 having still a high value, only a weak current of the order of 10% of the maximum current can circulate through transistor 105 and coil 7.

The function of capacitor 156 and resistance 155 is to protect the coil 7 when contact 154 is open.

Now the operation obtaining when changing from the ratio given by gears 12–14 to the more reduced ratio given by gears 13–15 will be described.

Before the change actually begins, the dogs associated with gears 12–14 are engaged and relays 35 and 207 are operated, and coils 33 and 208 are energized through contacts 30. Winding 209 of relay 207 is not energized, contacts 135 and 142 having been moved away from each other immediately upon starting the vehicle from rest. Due to the action of the servo mechanism 27, firstly shaft 26 and then fork 21 are moved, thus opening contacts 28 and 30, and restoring therefore relays 35 and 207 to their de-energized condition. The energization of electromagnet 47 through contact 36 causes the partial closing of throttle valve 6 whilst the opening of contact 154 entails the de-energization of coil 7 and the uncoupling of the clutch.

As the displacement of shaft 26 continues, the fork 21 engages the striker ring providing the ratio corresponding to gears 13–15, and shaft 26 completes its travel. Contact 28 closes, thus connecting one end of coil 33 to the positive terminal of battery 100. If at that time the twofold requirement of "depressed accelerator pedal" (i.e. with contact 34–40 closed) and "engine revolving slower than shaft 11" is met, that is, if contact 37 is connected to the negative terminal of the battery, then coil 33 has a return circuit and relay 35 is actuated. The opening of contact 36, by de-energizing the electromagnet 47, restores the throttle to its open position. Although contact 154 is closed, only zero current or a reduced current can flow through coil 7, since the return circuit to the negative terminal of resistance 115 controlling transistor 105 can be established only through the high-value resistance 202 which exists only in an alternate form of embodiment. The value of this resistance depends on the current gain of transistor 105. Moreover, the energization of windings 132 and 133 and diode 204 through contacts 34–40 and 37 limits the permissible maximum current in transistor 105 since the charging waves of capacitor 121, by which this transistor is released, undergo the maximum damping action.

Since relay 207 is now inoperative, capacitor 151 is re-charged through contacts 211–212. The current intensity in the clutch, in an alternate form of embodiment, does not depend on the time elapsed since the maneuver was started, as long as contacts 30 are not closed.

The engine re-acceleration resulting from the release of electromagnet 47 causes the engine speed to pick up until shafts 44 and 11 rotate at equal speeds. Shaft 11 tends to revolve at a higher speed under the influence of the torque transmitted by the synchromesh device providing the 13–15 gear ratio and by the suppression of the braking force caused by the natural drag or by the clutch, whereby the opening of contact 37 takes place at a r.p.m. value close to the one ensuring the synchronization between 44 and 22, except for the reducing ratio.

The opening of contact 37 restores relay 35 to its inoperative condition and involves again the closing of the throttle valve and a complete de-energization of coil 7.

The re-engagement of the dog teeth causes the closing of contacts 30 whereby relay 35 is re-actuated and coil 7 normally re-energized while restoring the throttle opening.

Relay 207 is also actuated through its winding 208.

A rapid synchronization is obtained as a rule when the gearbox oil is at the proper operating temperature and may eliminate the intermediate beat of relay 35, since contact 37 opens only when the dogs are engaged.

The relay 207 resumes its operative condition after the inoperative time period, which permitted the re-charging of the tank capacitor 151 during the gear change, has elapsed. The opening of contacts 211–212 permits the gradual discharge of capacitor 151 through resistance 149 and capacitor 121, thus establishing in the clutch a current flow which is a function of the engine speed and of the time elapsed since the actuation of relay 35, this engine-speed parameter being smoothed up by the connection of resistances 148 and 201 across the terminals of windings 132 and 133. Resistance 201 is short-circuited by contact 200 in the first gear ratio so as to further smooth the operation by suppressing resistance 201. This smoothing of the current intensity as a function of speed can exist only beyond a certain vehicle speed. In fact, at low speed contacts 135–142 are connected as a consequence of the operation of mechanism 141, winding 209 is energized and the opposition of the two relays restores relay 207 to its inoperative position establishing a current intensity characteristic in the coupler as a function of engine speed, wherein the time factor is no more effective, this characteristic being utilized for starting the engine.

The function of diodes 203 and 206 is only to avoid any reactions between the various circuits.

The following results have been obtained when changing to a lower gear by incorporating the device constituting the subject-matter of this invention in an automatic or semi-automatic transmission:

(1) Faster dog engagement.

(2) Protection of synchromesh striking rings against wear and tear.

(3) Engine acceleration occurring before the end of the gear shift movement.

(4) Substantial increase in re-coupling smoothness, notably during the initial phase of the recoupling process.

According to a known arrangement not shown in FIGURE 3 the front contact 154 of relay 35 may be replaced with a double reversing switch connected to each end of coil 7 in order to provide, in the operative position of relay 35, the same circuit as in the case illustrated in FIGURE 3, and, in the inoperative position of this relay, a reversed feed of coil 7 with a low current for example through a resistance connected to one of the battery terminals in order to reduce the remnant magnetism and the clutch drag, notably in the case of magnetic-power clutches.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A device for controlling the change of speed of an automatic transmission of an automotive vehicle in which said vehicle comprises an engine, throttle means for controlling fuel flow to said engine, a transmission including a means for selecting various gear ratios, and a clutch having a driving member connected to said engine and a driven member connected to said transmission, said device comprising an electric control circuit means having a plurality of contacts operatively connected to sequentially control said throttle means and said clutch means, means for sensing the speed of said vehicle, a servo mechanism responsive to said speed sensing means, said servo mechanism being operatively connected to actuate said electric circuit contacts, a lost motion device operatively connecting said servo mechanism to said gear selecting means for selecting the various gear ratios, whereby upon the passage between gear ratios said servo mechanism sequentially actuates contacts to disengage said clutch, actuates said throttle means to retard said engine and, when said transmission is sufficiently reengaged, reengages said clutch and accelerates said engine.

2. In a vehicle having an engine, a transmission comprising a transmission case, a synchronization ring, a sliding collar, a dog and a selection fork in said case, a clutch having a driving part connected to said engine and a driven part connected to said transmission and being adapted to selectively engage and disengage, and a carburetor operatively connected to an accelerator pedal to control the amount of fuel fed to said engine, a device for controlling the speed of said engine during a gear change comprising an auxiliary inlet valve for controlling the fuel fed to said engine, a servo mechanism responsive to the speed of said vehicle and operatively connected to displace said selection fork through a lost motion device, an electric control circuit having a plurality of contacts controlled by said servo mechanism, said circuit controlling the actuation of said auxiliary inlet valve and the engagement of said clutch whereby upon changing gear ratios said clutch is disengaged, said auxiliary inlet valve closed to throttle said engine and said sliding fork causes said collar to engage the next dog and whereupon sufficient engagement of said collar and dog is achieved, said auxiliary inlet valve is opened to reaccelerate said engine and said clutch is reengaged.

3. A device for controlling the change of speed of an automatic transmission of an automotive vehicle having an engine comprising a transmission having a synchronizing ring, sliding collar, dog and selection fork, a clutch having a driving part connected to the engine and a driven part connected to the transmission and a synchronization detector between the two parts; a servo mechanism responsive to the speed of the vehicle and operatively connected with the transmission to displace said selection fork through a lost motion device, contacts of an electric circuit actuated by said servo mechanism to control an auxiliary gas inlet valve of the carburetor upon predetermined movement of said lost motion device, said contacts further controlling the engagement of said clutch, whereby upon the passage between speed ratios, the clutch is disengaged and the auxiliary valve is closed and synchronization detector closes a contact to open said auxiliary valve to reaccelerate the engine, said synchronization detector opening said contact to close the auxiliary valve when the engine brings the driving and driven parts of the clutch into synchronization.

4. The device according to claim 3 in which the control of the auxiliary gas inlet valve is effected by a relay the exciting circuit of which is in series with the contact actuated by the synchronization detector and comprises a contact which is connected to the accelerator pedal and is open in the rest position of the pedal and closed as soon as the latter is depressed.

References Cited

UNITED STATES PATENTS

| 2,766,862 | 10/1956 | Binder | 192—.08 |
| 2,949,174 | 8/1960 | Bomhard | 192—.08 |
| 3,126,989 | 3/1964 | Baumann | 74—472.3 |

ROBERT M. WALKER, *Primary Examiner.*

DAVID J. WILLIAMOWSKY, *Examiner.*

H. S. LAYTON, *Assistant Examiner.*